United States Patent Office.

EMIL PREVOST, OF NEW YORK, N. Y.

Letters Patent No. 107,811, dated September 27, 1870.

IMPROVEMENT IN LIQUIDS FOR GALVANIC BATTERIES.

The Schedule referred to in these Letters Patent and making part of the same.

*To all whom it may concern:*

Be it known that I, EMIL PREVOST, of the city, county, and State of New York, have invented a new and improved Liquid for Electric Batteries; and I do hereby declare the following to be a full, clear, and exact description thereof, which will enable those skilled in the art to make and use the same.

This invention relates to a liquid which is to be used in connection with electric batteries, of any desired construction, and which is capable of producing a constant electric current for forty-eight consecutive hours, or more, without being renewed. It is made of bichromate of potash, dissolved in water, and of sulphuric acid, to which may be added, in certain cases, a small quantity of chromic acid.

The proportion in which I mix the above-named ingredients together is about as follows:

Water, eight hundred grammes; bichromate of potash, fifty grammes; sulphuric acid, fifty grammes; chromic acid, two grammes.

In constructing a battery with my liquid, I use, by preference, an element of carbon, and two elements of zinc, the carbon element being a flat plate, while the zinc elements may be either cylindrical or flat.

After the liquid, prepared as above stated, of water, bichromate of potash, and sulphuric acid, has been poured into the jar containing the elements, it is mixed with chromic acid, taking about two grammes to one quart of the liquid, and the mixture being well stirred, will act on the elements with a uniform energy for several days, and it will produce heat as well as light without interruption, and without requiring any attention.

What I claim as new, and desire to secure by Letters Patent, is—

A liquid for electric batteries, made of the ingredients herein set forth, and mixed together in about the proportion above described.

This specification signed by me this 22d day of July, 1870.

EMIL PREVOST.

Witnesses:
ADRIEN RABLAT.
W. HAUFF.